V. J. ANDERSON.
SAFETY STREET CAR FENDER.
APPLICATION FILED JAN. 9, 1913.
1,102,563.
Patented July 7, 1914.
2 SHEETS—SHEET 1.
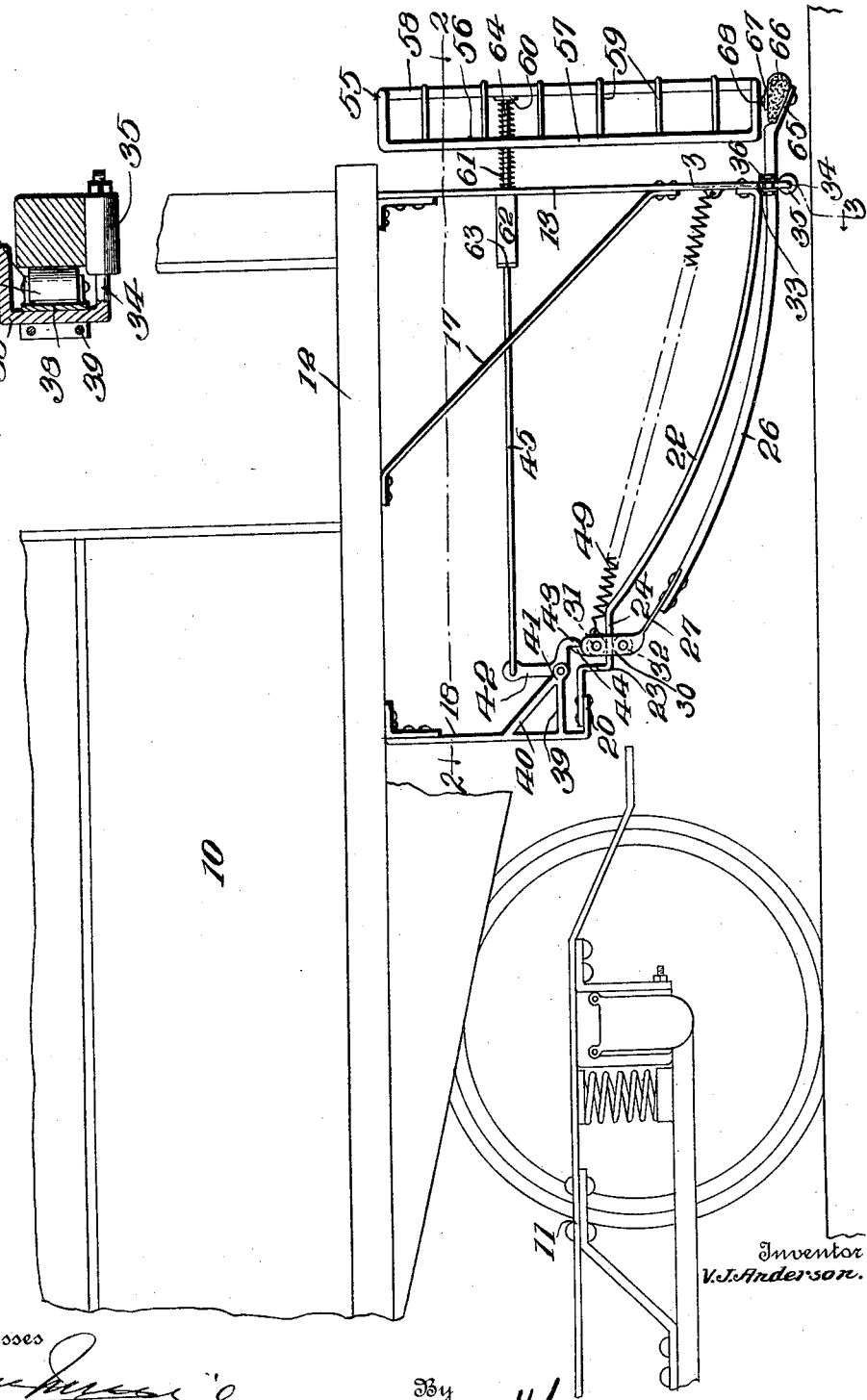
Inventor
V. J. Anderson.

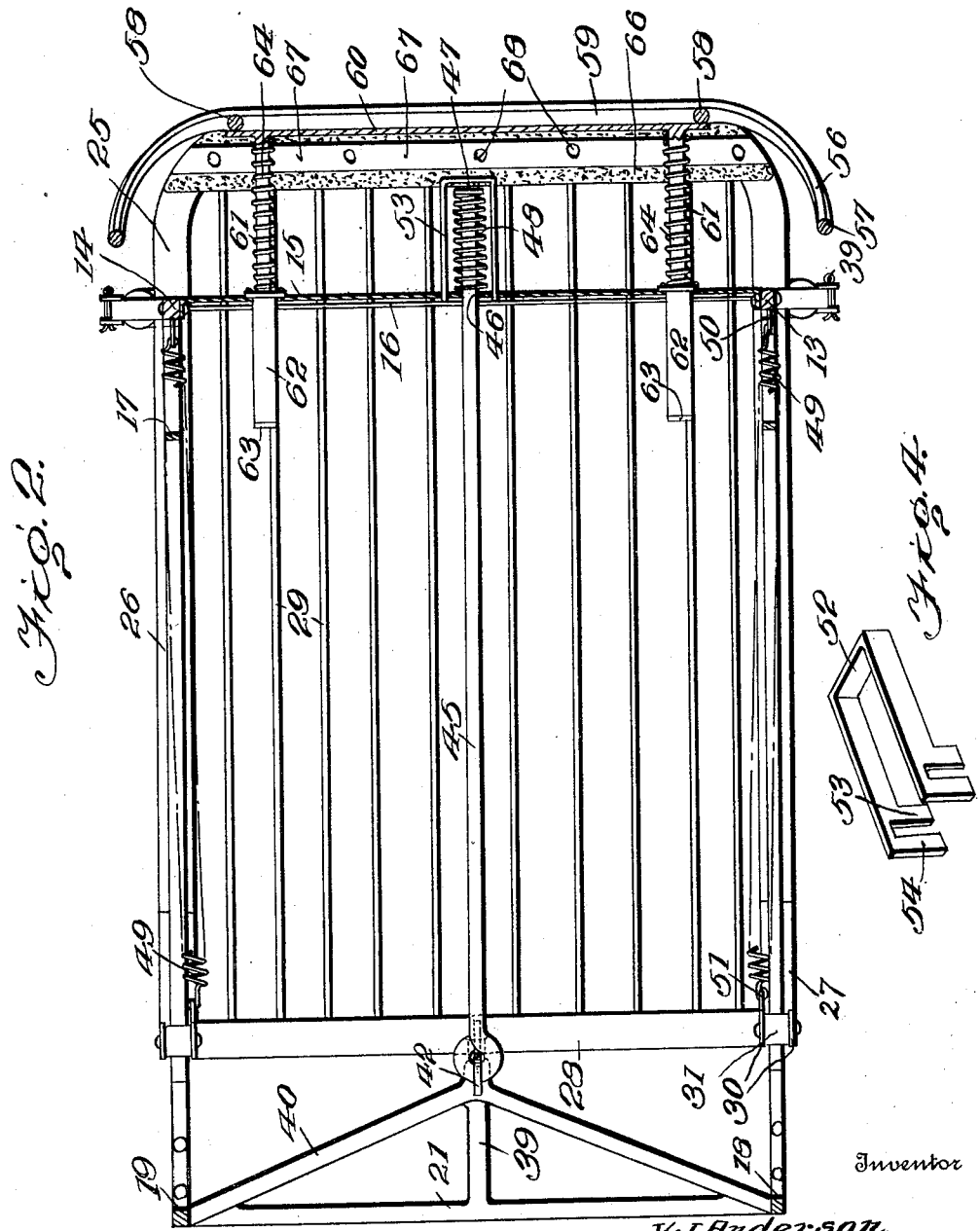

UNITED STATES PATENT OFFICE.

VANCE J. ANDERSON, OF CHICAGO, ILLINOIS.

SAFETY STREET-CAR FENDER.

1,102,563.

Specification of Letters Patent.

Patented July 7, 1914.

Application filed January 9, 1913. Serial No. 741,037.

*To all whom it may concern:*

Be it known that I, VANCE J. ANDERSON, a citizen of the United States, residing at Chicago, in the county of Cook and State of Illinois, have invented certain new and useful Improvements in Safety Street-Car Fenders, of which the following is a specification.

My invention relates to new and useful improvements in car fenders and more particularly in car fenders for use upon street cars and the object of my invention is to provide a fender including a vertical, resiliently mounted buffer member and a fender member proper which is normally held in retracted position beneath the forward end of the car, but which is released by movement of the buffer member to move in advance of the car and receive and support anyone struck by the buffer member.

A further object of my invention is to so construct the buffer member that its rearward movement upon impact from a body, is limited while at the same time sufficient to release the fender member.

A further object of my invention is to mount the movable fender member upon rollers in such a manner that it may be readily moved in either direction upon its supports and to provide relatively heavy springs, the normal tendency of which is to hold the fender member in extended position. And a still further object of my invention is to provide a removable pad for the forward edge of the fender member to prevent injury to the persons struck thereby.

With these and other objects in view, my invention will be more fully described, illustrated in the accompanying drawings, and then specifically pointed out in the claims which are attached to and form a part of this application.

In the drawings: Figure 1 is a fragmentary side elevation of a conventional car, showing my improved fender construction in use; Fig. 2 is a section on the line 2—2 of Fig. 1, showing the fender proper in plan and in its retracted position; Fig. 3 is a detail sectional view on the line 3—3 of Fig. 1, showing the mounting of certain of the supporting rollers.

Corresponding and like parts are referred to in the following description and indicated in all the views of the drawings by the same reference characters.

In order to insure a clear understanding of my invention, I have illustrated the same in use upon a conventional form of street railway car 10, the forward wheel truck and platform of the car being designated by the numerals 11 and 12, respectively. Extending downwardly from the forward portion of the platform 12 and adjacent each side thereof, are spaced hangers 13 and 14 connected intermediate their length by a horizontally extending cross bar 15 and adjacent their lower ends by a tie bolt 16. Upwardly and rearwardly extending braces 17 assist in supporting the hangers and hold the same against rearward movement.

Extending downwardly from the bottom of the car and directly in rearward alinement with the hangers 13 and 14, are hangers 18 and 19 provided at their ends with forwardly directed arms 20 and connected intermediate their length by an integrally formed transverse brace 21. Connecting each of the arms 20 with the lower end of the corresponding forward hanger, is a downwardly inclined arcuate guide or track 22, the rear end of which is provided adjacent the arm 20 with a vertical stop shoulder 23 and immediately in advance of said shoulder with a horizontal portion 24.

The structure above described comprises the main supporting frame of my buffer and fender, the fender, as best shown in Fig. 2 of the drawings, comprising a substantially rectangular shaped frame 25 of metal curved longitudinally to conform somewhat to the curvature of the track 22. The body member proper of this fender 25 consists of a substantially U-shaped forward portion or main frame 26, the free ends of which are connected to L-shaped roller carrying arms 27 which are in turn connected by a cross brace 28 forming the rear end of the fender frame. This frame carries a plurality of longitudinally extending slats or bars 29 which form the body of the fender. Journaled in suitable bearings formed in the spaced ears 30 of the L-shaped arms 27, are spaced rollers 31 and 32 which engage one above and the other below the tracks 22 and thus support the rear end of the fender.

As best illustrated in Fig. 3 of the drawings, the lower ends of the hangers 13 and 14 are provided with lateral offsets 33, the inwardly directed, horizontal terminals of which are rounded to form shafts 34 upon which are journaled rollers 35 upon which the side members of the frame 25 rest. Each of the offset portions 33 carries a vertical roller 36 which bears against the outer faces of the fender frame, this roller being journaled between spaced ears 37 carried by U-shaped plates 38, the bite portions of which seat against the inner face of the offset portions and the sides of which extend outwardly beyond the same, these plates being secured in place by cotter pins 39 or other suitable fastening devices. This construction avoids weakening of the hangers and in fact the plates 31 somewhat strengthen and brace the hangers.

From the foregoing description it will be apparent that the fender member proper is supported at its rear end and maintained against disengagement from the track 22 by the spaced rollers 31 and 32 and is supported and guided at its forward end by engagement between the rollers 36 and upon the rollers 35, the fender being therefore free for forward movement along the track to advance its forward end beyond the hangers 13.

The supporting bracket formed by the hangers 18 and 19 and the brace 21 is provided with a centrally formed forwardly directed arm 39, the free end of which is suitably braced by rearwardly and upwardly extending braces 40. This free end is bifurcated to form spaced ears 41 between which is mounted an L-shaped trigger 42, one arm of which extends forwardly in a horizontal direction and is provided with a downwardly depending shoulder 43 which, in normal position of the fender, engages the forward face of an upwardly directed finger 44 carried by the end member 28 of the fender frame to hold the fender in retracted position with its rollers 31 and 32 bearing against the horizontal portions of the tracks 22. Pivotally connected to the upper end of the trigger 42, is a rod 45, the forward end of which is passed through an opening 46 formed in the cross bar 15 and provided with an enlarged head 47. A coiled spring 48 surrounds the forward end of this rod bearing between the head 47 and brace bar 15 to normally hold the trigger in operative position.

Relatively heavy coiled springs 49 are connected by their forward ends to ears 50 formed upon the lower end portions of the hangers 13 and 14 and by their opposite ends to ears 51 carried by the L-shaped arms 27 of the fender frame, these springs being under tension to move the fender to extended position for release of the trigger.

In order to provide means for releasing the trigger 42 and therefore causing the fender to move to extended position, I provide a substantially rectangular shaped buffer member 55, the ends of which are curved rearwardly as shown at 56, this member including the rectangular frame 57 connected intermediate its length by vertical braces 58 and provided with a plurality of spaced apart longitudinally extending slats 59. The braces 58 are connected intermediate their length by a transversely extending brace plate 60 provided adjacent each end with rearwardly directed shafts 61 which fit closely in sleeves 62 carried by the brace plate 15 and extending rearwardly therefrom, the free ends of the shafts extending through the sleeves and terminating in enlarged heads 63. Relatively strong coiled springs 64 surround these shafts and bear by their ends against the brace plate 60 and the forward ends of the sleeves to normally hold the buffer member in advanced position. It will of course be apparent that if the car strikes anyone, the buffer member will be forced rearwardly, breaking the shock, and at the same time engaging the extended end of the rod 45 to release the trigger and permit the springs 49 to advance the fender member 25. In order that the fender member 25, which to be effective must be advanced rapidly, may not injure the person struck, its forward frame member is preferably cut-away as shown at 65 to form a seat for a pad 66 of felt or other suitable material, which is preferably treated chemically to protect it from the weather and which is held in place by a clamp plate 67 and bolts 68 passed through the plate, pad and fender frame. In use, each car is equipped with two fenders, positioned one at each end and both normally retracted. As oftentimes the rear fender might be sprung by a vehicle or person striking against the same and as under such circumstances there is no need of having the fender proper moved to extended position, I prefer to provide a detachable lock which may be employed to hold the rear fender against extension, even when its buffer member is moved inwardly.

This lock comprises a substantially U-shaped body member 52, the ends of which are provided each with downwardly directed spaced fingers 53 and 54 adapted to engage the bar 15, immediately in front of and at the rear of the same. This lock 52 is so proportioned that when mounted in the manner shown in Fig. 2 of the drawings, its bite portion projects directly in front of the head 47 of the trigger releasing rod 45 and will therefore receive the impact of the buffer member and prevent the same striking against said head to release the trigger. As this lock may be readily applied or removed, it will be apparent that either fender may be secured against extension when desired.

From the foregoing description, it will be apparent that I have provided an extremely simple and effective form of fender for street cars and one which does not, under normal conditions, project to any appreciable degree, in advance of the car and which does not therefore obstruct traffic. At the same time, in case of accident, the fender proper is immediately advanced to support the person struck and thus prevent him from being injured. It will of course be understood that I do not wish in any way to limit myself to the specific details of construction, illustrated in the drawings and described in the above specification, as minor changes may at any time be made, without in the slightest degree departing from the spirit of my invention.

If desired, the hangers 13 and 18 may be made in adjustable sections secured together by bolts 80. This construction permits the fender to be employed upon cars of different heights or to be transferred from one car to another.

Having thus described the invention, what is claimed as new is:

1. A car fender including a supporting frame having spaced apart downwardly and forwardly inclined tracks provided adjacent their forward ends with roller bearings, a fender mounted for movement along said tracks and resting upon said roller bearings, additional roller bearings carried by the rear end of the fender and bearing above and below the tracks, springs tending to normally hold the fender in advanced position upon the tracks, a trigger carried by the frame and engaging the fender to hold the same in retracted position, a buffer, and means operable by impact against the buffer for releasing the trigger.

2. A car fender including a supporting frame having forwardly and downwardly inclined tracks and a cross brace, a fender mounted for movement along the tracks, a buffer mounted in advance of the cross brace, rearwardly directed sleeves carried by the cross brace, rods carried by the buffer and extending through the sleeves, said rods being provided at their free ends with heads to limit the forward movement of the buffer, springs bearing between the cross brace and buffer to normally hold the same in forward position, a trigger for normally holding the fender in rearward position, a rod connected to the trigger and passed through the cross brace, the free end of the rod having a head extending in the path of the buffer when the latter moves rearwardly, and a spring surrounding the rod and bearing between the head and cross brace to normally hold the rod in advanced position.

3. A car fender including a supporting frame, a buffer carried by the frame and mounted for rearward movement, a fender carried by the frame and mounted for forward movement, means normally holding the fender in rearward position, means operable by rearward movement of the buffer for releasing the fender holding means, and means interposable between the fender holding means and buffer to prevent release of the fender upon rearward movement of the buffer.

4. A car fender including a supporting frame having spaced apart downwardly and forwardly inclined tracks provided adjacent their ends with horizontally and vertically disposed roller bearings, a fender mounted for movement along said tracks and resting upon the horizontal bearings and engaging between the vertical bearings, spaced horizontal roller bearings carried by the rear end of the fender and engaging the upper and lower faces of the tracks, means normally tending to hold the fender in advance position, means carried by the frame for holding the fender in retracted position, a buffer, and means operable by impact against the buffer for releasing the latter holding means.

In testimony whereof I affix my signature in presence of two witnesses.

VANCE J. ANDERSON. [L. S.]

Witnesses:
 TERREVOUS L. DOUGLAS,
 G. M. DUNNINGTON.

Copies of this patent may be obtained for five cents each, by addressing the "Commissioner of Patents, Washington, D. C."